No. 773,023. PATENTED OCT. 25, 1904.
A. H. LOW & N. WILCOX.
VAPOR GENERATING LAMP.
APPLICATION FILED APR. 28, 1903.
NO MODEL.
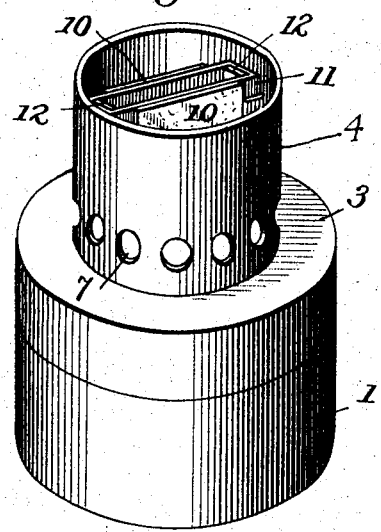
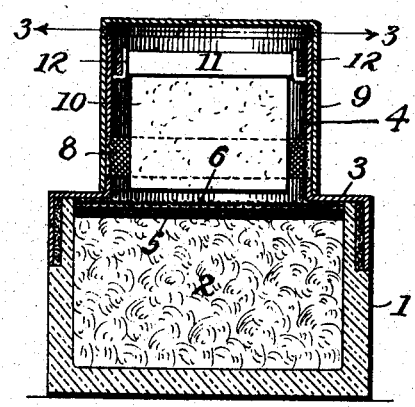
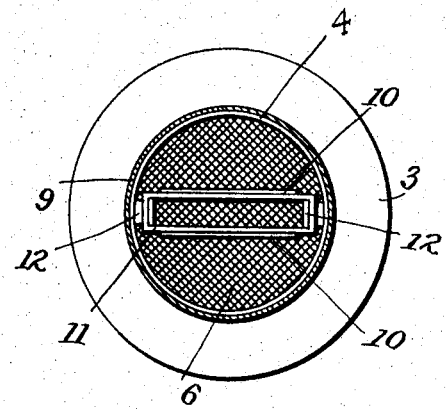
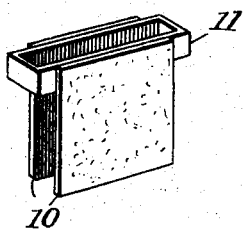
Witnesses
J. G. Hinkel
Arthur L. Bryant
Inventors
Albert H. Low and
Norris Wilcox
By
Attorneys No. 773,023. Patented October 25, 1904.

UNITED STATES PATENT OFFICE.

ALBERT H. LOW AND NORRIS WILCOX, OF DENVER, COLORADO.

VAPOR-GENERATING LAMP.

SPECIFICATION forming part of Letters Patent No. 773,023, dated October 25, 1904.

Application filed April 28, 1903. Serial No. 154,660. (No model.)

*To all whom it may concern:*

Be it known that we, ALBERT H. LOW and NORRIS WILCOX, citizens of the United States, residing at Denver, in the county of Denver, State of Colorado, have invented certain new and useful Improvements in Vapor-Generating Lamps, of which the following is a specification.

The present invention relates to improvements in lamps for generating deodorizing and disinfecting vapors; and it consists in the construction and arrangement of parts that will be hereinafter particularly described in connection with the accompanying drawings, in which—

Figure 1 is a perspective view of a lamp or vapor-generator constructed in accordance with the present invention, the cap or cover for the vapor-tube being removed. Fig. 2 is a vertical sectional view through the apparatus, illustrating a slight modification and showing the cap or cover in place. Fig. 3 is a horizontal sectional view on the line 3 3 of Fig. 2. Fig. 4 is a detail view of the glower removed from the lamp.

Referring to the drawings, in which like numerals of reference designate corresponding parts in the several figures, 1 designates the base or body of the lamp or generator. This body may be of any suitable size, form, and material. As shown, it is preferably made of glass, having a suitable cavity or recess to receive a body 2, of absorbent material, such as cotton, asbestos, &c. A metal top 3 is secured to said body and provided with an upwardly-extending collar 4, which surrounds the opening or burner at the top of the absorbent-receptacle in the body 1 and serves as a flue for the vapors rising from said burner when the lamp is in use. The upper end of said receptacle is closed in the form of lamp shown and the absorbent material therein covered by a layer 5 of asbestos-cloth and a sheet 6 of wire-gauze. A series of apertures 7 is formed in the said flue, or a section thereof may, as shown in Fig. 2, be formed of wire-gauze 8. Through such apertures or said gauze-section air can freely enter the lamp when the imperforate cover or cap 9 is removed. This, as shown, is of such size and form as to fit closely over the flue 4 and completely close the upper end thereof as well as the air-inlets near the body 1.

Within the flue 4 is arranged a glower formed of any suitable catalytic material. As shown, this glower is formed of two parallel vertically-arranged strips or sheets of platinized asbestos-paper 10, which are secured at their upper edges to a suitable metallic support 11, by which the glower is suspended from two inwardly-extending lugs or hooks 12. This construction provides a glower which can be readily removed from above the lamp through the upper open end of the flue and replaced if broken and has its parts so constructed and arranged that vapors rising from the lamp can circulate freely between and over each of them.

Instead of platinized asbestos-paper other platinized incombustible material may be employed in the construction of the glower—such, for instance, as thin baked clay or platinum—or any desired catalytic material in other shapes and conditions, such as thin foil or gauze, may be used for this purpose.

The manner of using the improved lamp or generator above described may be briefly stated, as follows: The cap or cover 9 being removed, a suitable quantity of alcohol or other vapor-producing combustible liquid or mixture of the proper character to produce the desired vapor is supplied to the absorbent body 2 of the lamp. By reference to Fig. 3 it will be seen that the glower covers but a minimum amount of the surface of the opening in the top of the body 1, forming the burner of the lamp, and therefore the alcohol or other liquid employed can be readily poured into said opening on either side of the glower, although no harm is done by pouring it directly through or upon the glower. The lamp, which, it will be noticed, is similar to the lamps ordinarily used in connection with chafing-dishes and for similar purposes, is then lighted and allowed to burn a short time, sufficiently long to evaporate any liquid that may be on the glower and to heat the latter. The flame is then extinguished, and thereafter the combustible vapors rising through the flue 4 and mixing with air entering said flue will cause the glower to become highly heated and the required disinfecting and deodorizing vapor will be produced. The character of this vapor depends on the nature of the liquid supplied to the lamp. If ethyl or grain alcohol is used, acetaldehyde or "aldehyde" vapor will be produced, whereas if methyl or wood alcohol is employed formaldehyde-vapor will be obtained. The liquids named are those ordinarily intended to be used; but other liquids or mixtures of the proper character may be equally well employed, if desired—for instance, a solution of carbolic acid in alcohol or petroleum naphtha.

The action of the lamp or generator is stopped whenever desired by placing the cap or cover 9 over the flue 4, as shown in Fig. 2.

It will be noticed that this generator is very simple and inexpensive in construction, and the glower, which is the only part at all liable to be injured by handling, is protected and if damaged can be readily removed and replaced by a new one.

Having thus described the invention and without intending to limit ourselves to the exact details of the embodiment of the invention herein illustrated and described, what we claim, and desire to secure by Letters Patent, is—

1. In a deodorizing and disinfecting vapor generator, the combination of a suitable lamp, and a glower including a body of catalytic material supported above the lamp with faces in planes parallel to the path of movement of the mixture of air and combustible vapor.

2. In a deodorizing and disinfecting vapor generator, the combination of a lamp, a flue rising from said lamp above the burner thereof and provided above the burner with suitable inwardly-extending projections, and a glower consisting of a suitable frame adapted to be freely inserted in and removed from the upper end of said flue, and to be supported therein by said inwardly-extending projections, and a body of catalytic material connected to and depending from said frame.

3. In a deodorizing and disinfecting vapor generator, the combination with a suitable lamp, of a glower formed of catalytic material, supported above the burner of the lamp and consisting of a plurality of bodies arranged in an approximately vertical position and so that the mixture of air and combustible vapor can circulate freely around or between them.

4. In a deodorizing and disinfecting vapor generator, the combination of a lamp, a flue rising from said lamp about the burner thereof and provided, above said burner, with a plurality of inwardly-extending studs, the free ends of which are bent upwardly, and a glower consisting of a frame adapted to be inserted in said flue and supported therein by said studs and a plurality of parallel bodies of catalytic material attached to and depending from said frame.

In testimony whereof we have signed our names to this specification in the presence of two subscribing witnesses.

ALBERT H. LOW.
NORRIS WILCOX.

Witnesses:
H. E. DOVEY,
R. E. ZINN.